Aug. 5, 1958  A. F. VOGT  2,846,631
EDDY-CURRENT BRAKE FOR HOISTS AND THE LIKE
Filed June 11, 1956  3 Sheets-Sheet 2
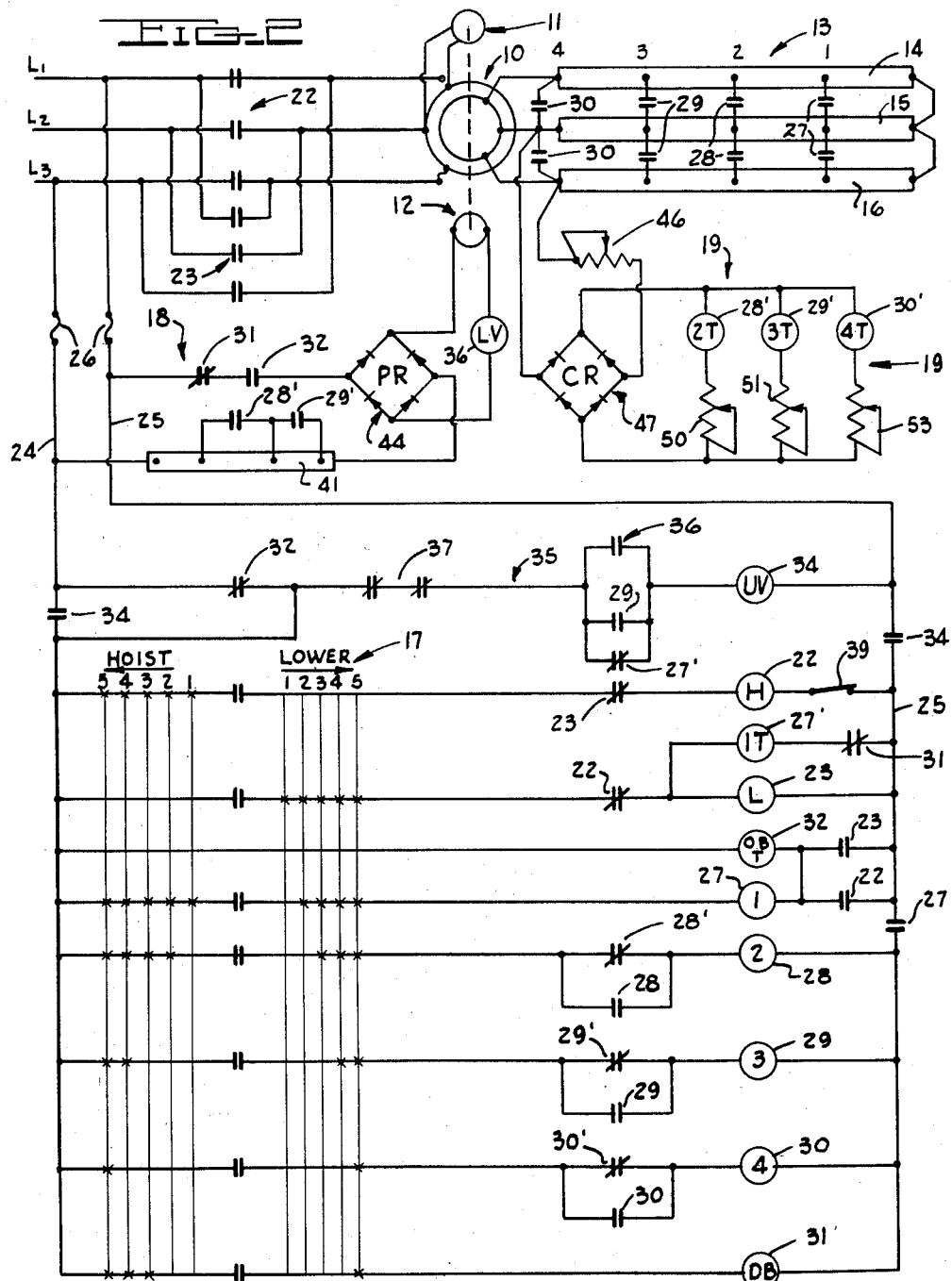
INVENTOR
ALBERT F. VOGT
BY Whittemore, Hulbert &
Belknap
ATTORNEYS

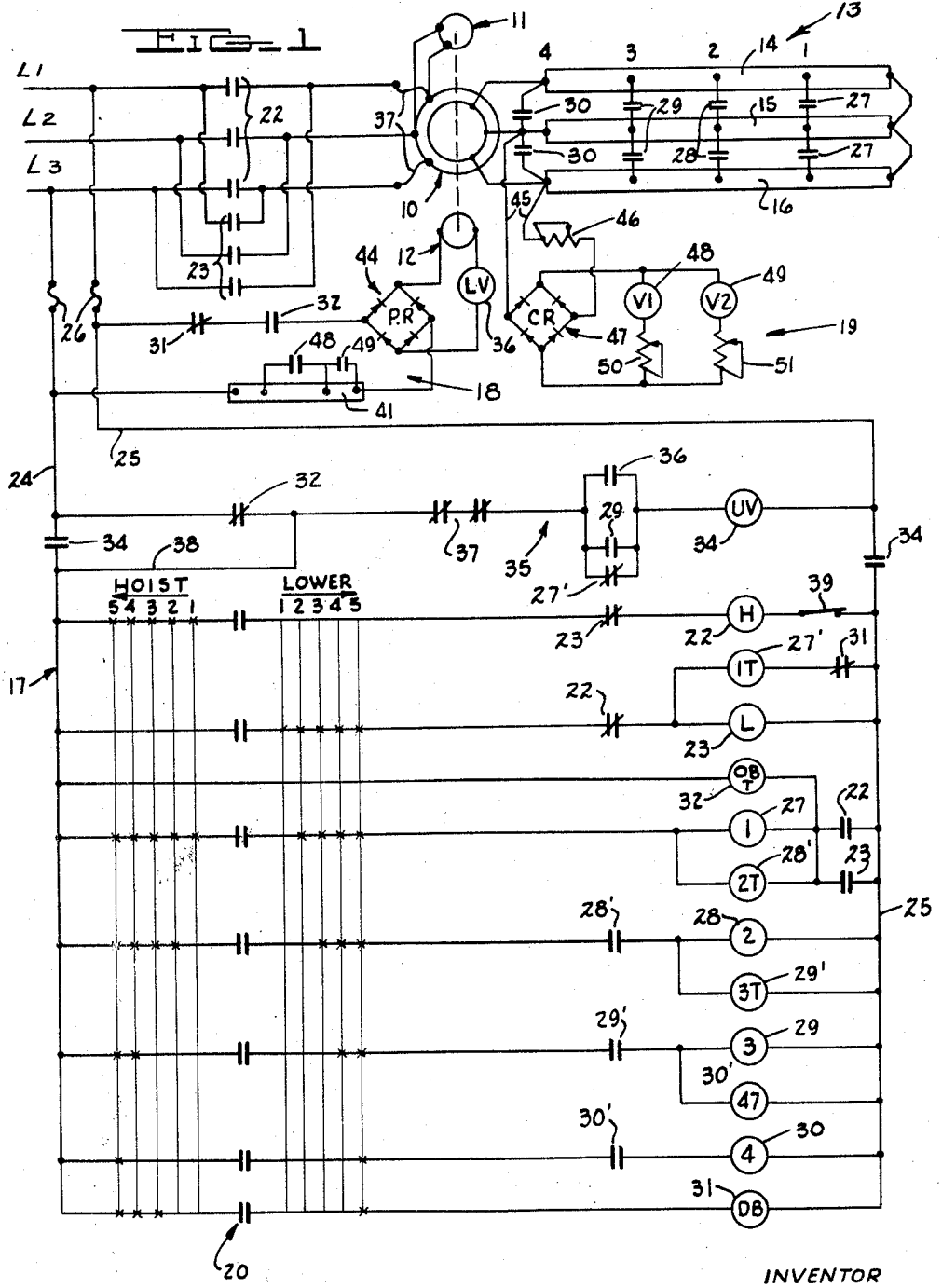

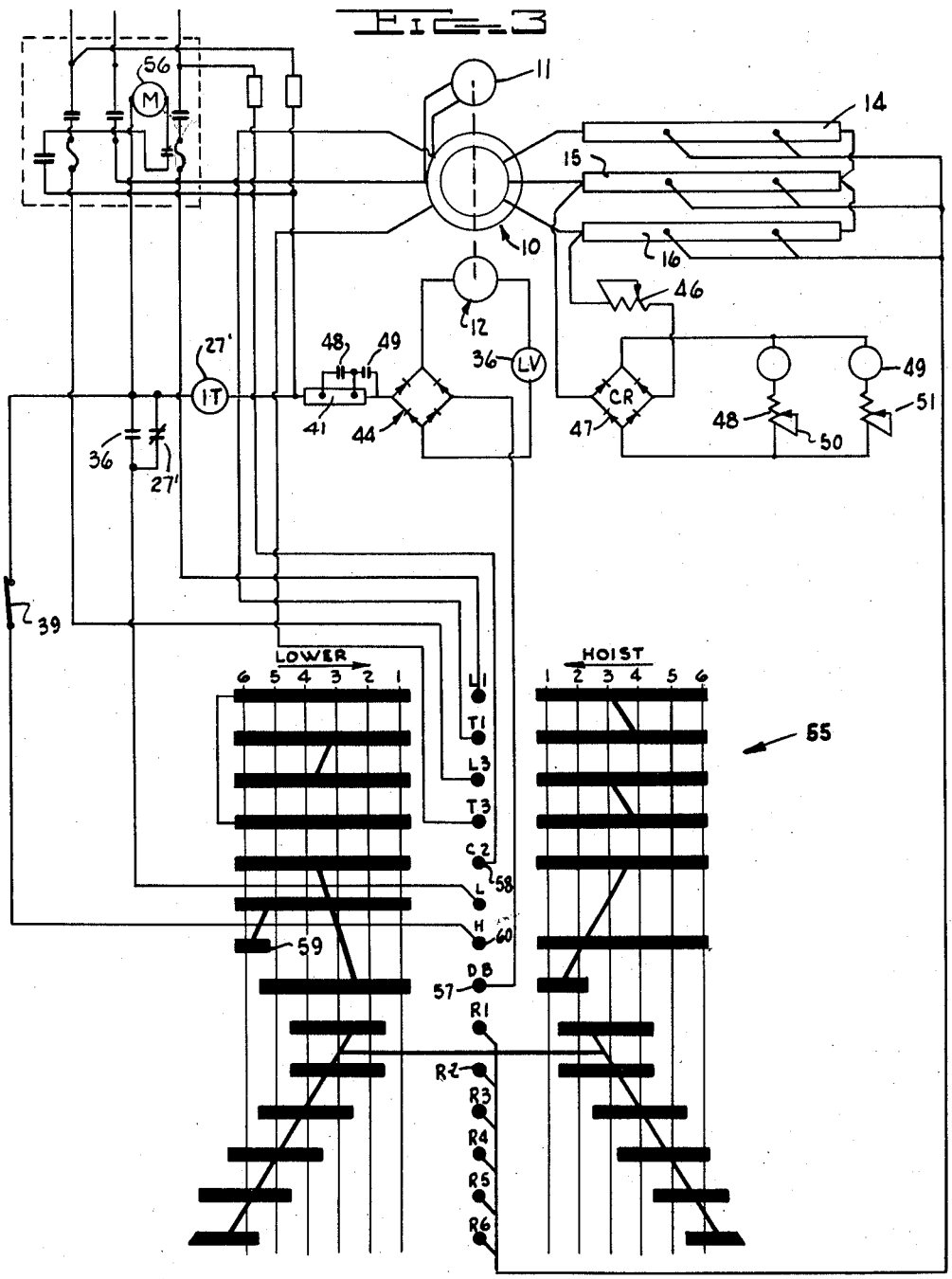

United States Patent Office 2,846,631
Patented Aug. 5, 1958

2,846,631

EDDY-CURRENT BRAKE FOR HOISTS AND THE LIKE

Albert F. Vogt, Ferndale, Mich., assignor to Northern Engineering Works, Detroit, Mich., a corporation of Michigan Application June 11, 1956, Serial No. 590,472

2 Claims. (Cl. 318—209)

The present invention relates to an improved system or circuit for the control of a dynamic, so-called eddy-current brake for hoisting or related equipment powered by a wound rotor motor, whose secondary or rotor circuit is the agency by which the excitation of the brake is governed in accordance with the speed of the motor.

It is an object of the improved circuit to provide an eddy-current brake control action of great smoothness of acceleration and deceleration. Thus, as the hoist motor accelerates, the excitation of the brake is decreased in response to the acceleration, causing a further increase in speed.

In accordance with a further object, the acceleration takes place in two steps at certain of the hoisting and lowering points of the master controller of the system, in the interest of minimizing mechanical wear on the apparatus, shocks and vibration.

Yet another object is to provide a brake control circuit in which the hoist motor can accelerate quickly to full speed, without energizing its eddy-current brake, by simply throwing the master control switch to its full hoist or its full lower point.

More specifically, it is an object of the invention to provide a control system or circuit as described, in which the above objectives are obtained by the use of voltage sensitive relays energized selectively and progressively from the secondary circuit of the motor in accordance with its speed. The circuit is a desirable one in that its sensitivity in regard to the excitation of the eddy-current brake may be easily regulated in the field by a simple adjustment of resistors which in part constitute the voltage sensitive relays.

A still further object is to provide a system as described, in which the control of eddy-current brake excitation and motor acceleration are both controlled by speed responsive means including sensitive relays in the secondary circuit of the motor.

Yet another object is to provide a system of the above mentioned sort, which is flexible in its application, in that master control of the circuits may be had using either magnetic type contactors or a drum or manual controller for reversing and accelerating.

The foregoing as well as other objects will be made more apparent as this description proceeds, especially when considered in connection with the accompanying drawings, wherein:

Fig. 1 is a simplified line diagram layout of a system or circuit affording a speed responsive control of a dynamic brake in accordance with the invention;

Fig. 2 is a similar diagram illustrating the system or circuit as adapted for the control of both the brake and the motor; and Fig. 3 is a diagram similar to Fig. 1, showing the system as employed in association with a manual or drum type master controller.

Referring first to Fig. 1 of the drawings, the reference numeral 10 generally designates as induction motor having a wound rotor, with its primary supplied by the leads or lines $L_1$, $L_2$ and $L_3$ of a three phase voltage source. In a hoist installation to which the system is applied, the motor 10 controls hoisting and lowering rotation of the usual cable drum (not shown). A conventional electrical shoe brake 11, adapted to have its shoes released to brake the motor 10, acts on the shaft of the latter in the known way, and its magnet winding is supplied by leads connected across two phases of the line voltage supply. A conventional dynamic or eddy-current brake 12 is similarly effective on the motor shaft.

The brake 12 is a non-mechanical type exerting resistive torque on the motor shaft in proportion to its speed and the eddy-current produced therein upon varying excitation of its windings, in a well known manner. The invention does not concern itself with the structure or operation of this eddy-current brake, other than in the respect that its operation in applying resistive torque is responsive entirely to circuit provisions which are themselves responsive to varying motor speed, as indicated above.

The main components of the circuit of Fig. 1, certain of which are themselves old and well known, are a secondary circuit 13 including resistors 14, 15 and 16, which are shorted out in response to the actuation of a master control circuit or switch 17 of the magnetic type, a brake power supply circuit 18 and a brake control circuit 19.

The master switch 17 is a conventional one, including a set 20 of individually unnumbered contacts, normally open in the neutral position of the controller and closed as the switch is set at its successive indicated hoisting and lowering speed points, designated "1," "2," "3," "4" and "5."

The schematic line diagram showing of Fig. 1 has been adopted in the interest of simplicity, and in furtherance of this interest various relays have their coils and the contacts governed by those coils designated by the same reference numerals. In instances where the relays are of the time delay type, reference numerals corresponding to those applied to the instantaneous type are designated by corresponding numerals, primed. Furthermore, to the extent that it will contribute to clarity, further identifying characters commonly used in the art are applied to certain of the power contactor and control relay elements, the significance of which will appear as the description proceeds.

Since the control circuit 17 is in the main conventional as to its arrangement of line interlocks and motor speed controlled relays, these components will be but briefly described. The reference numerals 22 and 23 indicate "hoist" and "lower" line contactors connected with their correspondingly numbered interlock contacts across leads 24 and 25, which are connected to two of the phase lines of the three phase power supply, as the lines $L_1$ and $L_3$. Overload control fuses 26 are placed in those lines. Contactors 27, 28, 29 and 30 are similarly connected across the line supply leads, with the first speed time delay relay 27' connected in parallel with the contactor coil 23 for lowering, and the delay relays 28', 29' and 30' similarly paralleled with the contactor coils 27, 28, 29 and 30.

An eddy-current brake control relay 31 is connected in the master switch circuit for third, fourth and fifth hoisting speeds and fifth lowering speeds, while a time delay relay 32 for the control of off-point braking is connected across leads 24, 25, as shown, to be energized selectively as the contacts of the hoist and lower contactors 22, 23, respectively, are closed. Here it should be noted that the off-point brake relay 32 is of the type which effects a time delay of a second or so when de-energized before reopening its contact. The other time delay relays 27', 28', 29' and 30' effect their delay when energized.

Under-voltage relay contacts 34 are series connected in the line voltage leads 24, 25 in the usual way, and a protective and holding circuit 35 is also connected across these leads, including the under-voltage relay coil in series with a parallel arrangement of a low voltage relay contactor 36 (whose coil is in the D. C. power supply circuit 18), a normally open interlock of fourth speed contactor coil 29, and a normally closed time relay contact 27'; a pair of overload relay contacts 37 and an off-point braking relay contact 32, with a lead 38 shunting this contact in relation to the under-voltage contact 34 in supply lead 24.

A hoist limit switch 39 is connected in series in the hoist line contactor coil for the purpose of cutting power in the event of carelessness on the part of the operator.

It is seen that the arrangements in the speed governing circuit of the master controller 17 are, in general, conventional. Such provisions as have particular significance in the control of the eddy-current brake 12, in cooperation with the power supply and control circuits 18, 19, respectively, will be pointed out in the description of the operation to follow.

The power supply circuit 18 is connected across the supply leads 24, 25 in a circuit including an eddy-current brake resistor 41, which is adapted to be partially or wholly shunted in the manner to be described, and also the series connected eddy-current brake relay contact 31 and off-point braking relay contact 32, to the respective input terminals of a power rectifier 44. The output terminals of this rectifier are connected to the windings of the eddy-current brake 12, with the coil of the low voltage relay 36 in series.

The control circuit 19 is supplied through leads 45 in parallel with two of the secondary resistors 15, 16 of the motor secondary circuit 13. One of the leads 45 is connected through a variable resistor 46 to an input terminal of a control rectifier 47, the other lead 45 being direct connected to the other input terminal of this rectifier. Voltage sensitive relays 48, 49, equipped with the respective voltage adjusting variable resistors 50, 51 in series therewith, are connected across the output terminals of the control rectifier 47. The contacts of the relays 48, 49 are connected in shunt relation to successive portions of the power rectifier resistor 41, as shown.

Control circuit 19 is thus supplied from the motor secondary circuit 13 with a rectified voltage whose value varies in accordance with the speed of the motor, and which is effective through the differingly responsive relays 48, 49 (in accordance with the setting of their respective resistors 50, 51) to cause the brake power circuit 18 to be variably energized, depending upon the value of the resistance shorted out of brake resistor 41 as the speed of the motor 10 increases. Eddy-current brake 12 is accordingly excited in inverse ratio.

In operation, when the master controller or switch 17 is placed at the first hoist point, the hoist line contactor coil 22 is energized and its contacts close, and maximum voltage is applied to the relays 48, 49 of the control circuit 19, causing them to pick up. This shorts out substantially the full resistance at brake resistor 41, so that brake 12 has maximum excitation when, as simultaneously occurs, the off-point braking relay 32 closes to complete the power supply circuit 18. Because heavy loads on the hoist cannot be picked up on this point the first speed point contactor coil 27 is also closed when the controller is set as described. However, if it is desirable to have very slow speed with light loads, contactor 27 can be connected to remain open on the first point hoist.

When the master switch 17 is moved to the second point hoist, increased torque is applied to the motor 10 and second speed contactor 28 closes as the time delay relay 28' closes, causing the motor to have a further increase in speed. As the speed increases the voltage sensitive relay 48 will drop out, increasing the resistance of brake resistor 41 and diminishing the excitation of the brake 12, so that the motor speed will again increase.

With the master switch or controller 17 moved to the third point hoist, the circuit is the same as for the second point hoist setting, except that eddy-current brake relay 31 is energized to open its contact in the power supply circuit 18, and thus drop out all excitation of the brake 12. The system now acts as a conventional hoist control for third, fourth and fifth point positions of the switch 17, with motor acceleration through the time delay relays. Relays 48 and 49 are readily controlled, in operation in the field, by adjusting the respective resistors 50 and 51.

When the master controller 17 is moved to its neutral or "off" position (from either a hoist or a lower setting) the contact 32 of the off-point braking relay which is in the power supply circuit 18 remains closed for a second or so, keeping brake 12 energized to assist the shoe brake 11 in stopping the load, as is characteristic of off-point braking.

When the switch 17 is placed on the first point lower and the line contactor 23 for lower closes, maximum voltage is again applied to the control relays 48, 49, causing them to pick up, with 100 percent excitation of the eddy-current brake 12 when off-point braking contact 32 closes. Under-voltage relay 34 is now held in by the low voltage relay 36 in series with the brake coil. This is important, since loss of excitation of the eddy-current brake when lowering can cause the load to descend at unsafe speeds.

It is desired to use the eddy-current brake only for first point lowering, contactor 27 can be used to break jumpers between resistors 14, 15 and 16, thus leaving the secondary circuit open, and the motor would then be unable to apply torque to the load; thus with 100 percent excitation on the brake the load would descend under the control of the brake only.

When master switch 17 is on second point lower the line contactor 23, and off-point braking and low voltage relays 32 and 36, respectively, remain energized. Contactor 27 is now energized, shorting out secondary circuit resistance and causing more torque to be exerted on the motor rotor to increase its speed. When the switch 17 is shifted to third point lower, the contactors and relays 23, 32, 36 and 27 remain energized, and contactor 28 becomes energized as time delay relay 28' is closed. This causes another application of torque and increase of motor speed. As the secondary voltage decreases accordingly, sensitive relay 48 will drop out, causing less excitation of the winding of brake 12. The motor will increase its speed further.

The fourth point lower action is similar to the third, except that contactor 29 is energized as time delay relay 29' is closed. The secondary voltage will again drop as motor speed increases and sensitive relay 49 will now drop out also. At this point the normally open interlock 29 in the circuit 35 shorts out the contact 36. For this reason a loss of the direct current excitation of the brake 12 will not result in the motor 10 running away, inasmuch as little secondary resistance remains in the circuit, and the motor will act as a brake at slightly above synchronous speed.

On fifth point lower, the motor 10 has no external secondary resistance. Eddy-current brake relay 31 is energized, removing all brake excitation, and the motor will act as a brake at speed slightly in excess of synchronous speed.

Advantages of this system, as indicated above, are in its smoothness of motor acceleration, an increase in speed bringing a decrease of brake excitation with a further increase in speed. The acceleration is carried out in plural steps on several of the switch speed points, rather than one jump. Accordingly, there is less mechanical wear on the parts, as well as less shock and vibration.

Furthermore, by simply thowing master switch 17 to full hoist or full lower point, the motor 10 is caused to accelerate quickly through the time delay relays to full speed in either direction without energization of the eddy-current brake 12. When the same is energized, it is energized responsively to the changes in voltage of the motor secondary circuit resulting from its changes in speed as controlled by master switch 17.

The system shown in Fig. 2 is one by which both the excitation of the eddy-current brake and the acceleration of the motor 10 are controlled by the use of speed-voltage responsive relays in the secondary resistance circuit of the motor. Its components and electrical connections are to a very great extent identical to the components and connections shown in Fig. 1 and are, accordingly designated by corresponding reference numerals, without repeated description thereof. In fact, it suffices to complete the description of the brake and motor control circuit of Fig. 2 by mentioning its points of difference in relation to that of Fig. 1.

Thus, the voltage relays 28' and 29' for the second and third speed settings of master switch 17 are substituted in the control circuit 19 for the relays 48, 49 of Fig. 1, their respective contacts 28' and 29' being substituted for those of the relays 48, 49 in the brake resistor 41 of the power supply circuit 18.

The voltage relay 30' for the fourth speed point is connected in parallel with the relays 28', 29' across the output leads of the control rectifier 47, in series with a further adjustable and voltage sensitive resistor 53, for use only in controlling the contactor 30.

It may be desirable in some cases to use the relays 29' and 30' to control the excitation of the eddy-current brake, or even to use all three relays for this purpose.

A contact 27 of the first speed contactor is inserted in the control supply lead 25 between the coil of relay 28 and the contact of hoist line contactor 22. Furthermore, contacts of the second, third and fourth speed point relays 28', 29' and 30', respectively, are wired in parallel with the instantaneous interlocks of contactors 28, 29 and 30, respectively, of the second, third and fourth speed point circuits.

The operation of the system of Fig. 2 will be evident to those skilled in the art. The voltage responsive relays 28', 29' and 30' determine when the accelerating contactors in the secondary circuit will close, depending upon the speed of the motor, which in turn controls the excitation of brake 12. The excitation of the brake is thus dependent upon motor speed, as in the case of Fig. 1, and is a definite value for every speed point.

Fig. 3 of the drawings illustrates a modification of the principle of the invention in which a drum or manual controller, generally designated 55, is employed as a master control in lieu of the contactor arrangement of Fig. 1. In this installation, parts and relationships which correspond to those in Fig. 1, are designated by corresponding reference numerals.

The voltage sensitive relays 48, 49 of Fig. 3, of which variable resistors 50, 51 are respective components, are the same and react in the same way to control the excitation of the eddy-current brake 12.

A contactor 56 is used to remove all power to the motor 10 in the event the hoist limit switch 39 should open in the hoisting direction, or in case the low voltage relay 36 should open in the lowering direction.

Relay 36 is in series with the eddy-current brake, and if the brake excitation is removed or very low, relay 36 will drop out. When contact is made from a dynamic or eddy-current brake terminal 57 of the drum controller to a terminal 58 thereof the eddy-current brake 12 is energized, for hoist speed points 1 and 2 and for lower points 1 through 5. On the sixth lowering point a segment 59 is provided on the controller with which terminal 60 will contact, thus by-passing low voltage relay 36 through the light switch 39. The relay is open on this speed point.

The time relay 27' is employed only for starting in the lowering direction. Its purpose is to allow time for the contact of relay 36 to close.

Off-point braking can also be provided arranging the drum controller so that 58 and 57 also make contact in the off position. A normally open contact of a timer of the same type as the relay 32 in Fig. 1, would be placed in the line from terminal 57 to the power rectifier 44. This timer could be operated by a normally open interlock or across any two phases of the motor 10. This would keep the eddy-current brake energized for about a second and thus assist the shoe brake in stopping the load when the controller is returned to the off point.

What I claim as my invention is:

1. In a control system for a hoist or like mechanism having an electromagnetic brake operatively connected thereto to variably load said mechanism and thereby control its speed, and an induction motor drivingly connected to said brake and having a rotor external circuit variably energized in accordance with the motor speed, the improvement comprising a control circuit electrically connected to said brake to variably excite the same, said circuit comprising a voltage sensitive relay electrically connected to the rotor external circuit of said motor and electrically energized thereby, an excitation circuit electrically connected to said brake and a contact element operated by said relay and electrically connected to said excitation circuit to vary the excitation of said brake in response to varying motor speed.

2. In a control system for a hoist or like mechanism having an electromagnetic brake operatively connected thereto to variably load said mechanism and thereby control its speed, and an induction motor drivingly connected to said brake and having a rotor external circuit variably energized in accordance with the motor speed, the improvement comprising a control circuit electrically connected to said brake to variably excite the same, said circuit comprising a voltage sensitive relay electrically connected to the rotor external circuit of said motor and electrically energized thereby, an excitation circuit electrically connected to said brake, said excitation circuit including a variable resistance, and a contact element operated by said relay and electrically connected to said variable resistance to thereby vary the value of said resistance and the excitation of said brake in response to varying motor speed.

References Cited in the file of this patent

UNITED STATES PATENTS

| | | |
|---|---|---|
| 2,581,292 | Rathbun | Jan. 1, 1952 |
| 2,581,315 | Widdows | Jan. 1, 1952 |
| 2,766,415 | Schurr | Oct. 9, 1956 |

FOREIGN PATENTS

| | | |
|---|---|---|
| 736,714 | Great Britain | Sept. 14, 1955 |